LINE DEFLECTION SYSTEM FOR CATHODE RAY TUBES
Filed July 1, 1957
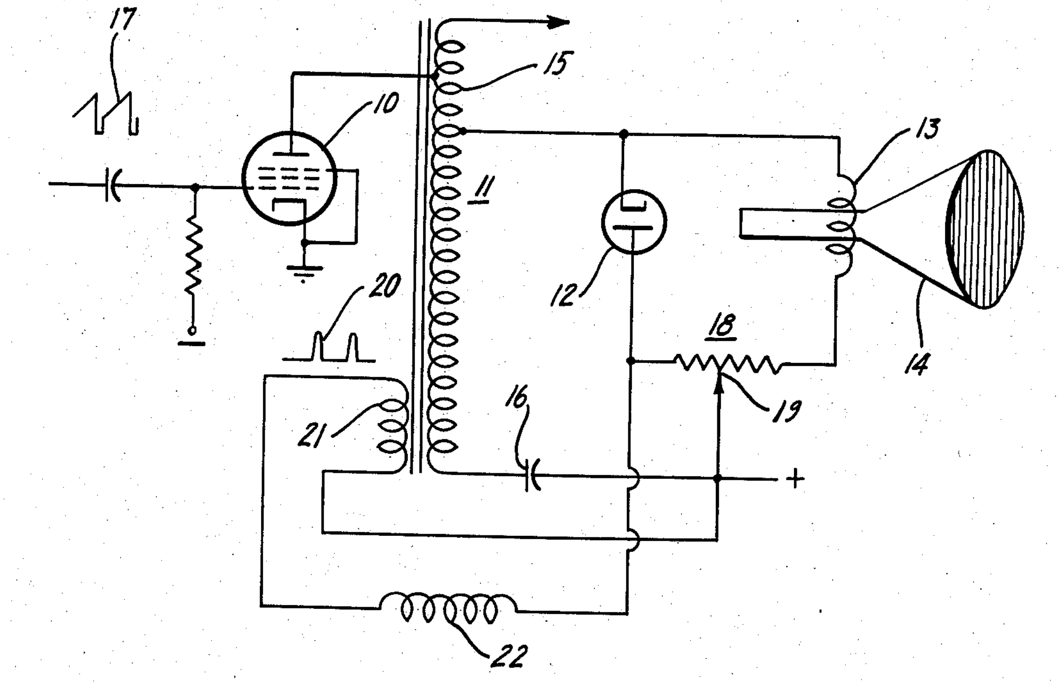
INVENTORS
PAUL G. WOLFE
ABRAM HOPENGARTEN
BY
Fordyce A. Bothwell
ATTORNEY 2,898,512

LINE DEFLECTION SYSTEM FOR CATHODE RAY TUBES

Paul G. Wolfe, Oreland, and Abram Hopengarten, Philadelphia, Pa., assignors to Philco Corporation, Philadelphia, Pa., a corporation of Pennsylvania Application July 1, 1957, Serial No. 669,268
10 Claims. (Cl. 315—27)

This invention relates to line deflection systems for cathode ray tubes, and more particularly to control of the sweep velocity in such systems.

In horizontal deflection systems of the type commonly employed in television receivers, horizontal deflection current is supplied to the horizontal deflecting coils of the yoke by the cooperative functioning of a driver tube, an output transformer, and a damper tube which is usually a diode. The deflection current waveform tends to be exponential rather than linear during each line scan, its slope generally being relatively larger during the first part of the scan and relatively smaller during the latter part of the scan. This tends to make the line scanning motion of the electron beam relatively fast during the first part and relatively slow during the latter part of the line scan.

In any television receiver, the horizontal sweep velocity is an important factor, and it is particularly important in color television receivers because proper color rendition requires proper coordination, during each line scan, of the beam position and the beam modulation. For example, in the case of a color television receiver wherein the screen of the picture tube has phosphor stripes arranged transversely to the direction of line scanning and comprising successive triplets emissive of light in three component colors such as red, green and blue, it is important that at any instant the beam impinge on the proper color stripe.

Whereas generally it is desirable to improve the linearity of the horizontal scan, in color television receivers such as those of the type mentioned a unique problem is presented. In such receivers, it has been found to be simpler to provide varying pitch of the color triplets to compensate for non-linearity of the horizontal scan, rather than provide uniform pitch of the triplets and strive for linearity of the line scan. The color stripes are preferably produced on the screen according to the method described in the copending application of M. Sadowsky and S. L. Parsons, Serial Number 408,219, filed February 4, 1954, which method involves light projection through masters having spaced translucent stripes. To compensate for non-linearity of the horizontal scan, the stripe pattern of the masters may be predetermined on the basis of an average sweep waveform. However this does not insure adequate matching of the stripe pattern and the sweep waveform for proper color rendition, since in manufacture there are bound to be variations of the stripe pattern and variations of the sweep waveform, the latter being due to variation of the resistance of the horizontal deflection coils from one yoke to another.

The principal object of the present invention is to provide an improved line deflection system wherein the deflection waveform may be fully controlled for any purpose, such as to match it to the pattern of the colored light producing elements of the screen in a color television receiver. By the use of this invention, the deflection waveform may be made either more linear or less linear. Thus in some color television receivers the deflection waveform may be better than the pattern of the colored light producing elements, and in such case the waveform may be degraded, i.e., made more non-linear, to match it to the said pattern. This, of course, is directly contrary to the general desirability of improving linearity of the horizontal deflection waveform.

A further object of the present invention is to provide for modification of the deflection waveform without changing the width of the line deflection.

In accordance with this invention, an arrangement is provided whereby the resistance of the deflection coil-damper combination may be varied to vary the deflection waveform without changing the width of the line deflection. This is accomplished by the inclusion of certain resistance components in circuit with the deflection coils and damper as hereinafter described.

The invention may be fully understood from the following detailed description with reference to the accompanying drawing wherein the single figure is a diagrammatic illustration of a horizontal deflection system embodying a preferred form of the present invention.

Referring more particularly to the drawing, the horizontal deflection system shown comprises essentially the driver tube 10, the output transformer 11, the damper tube 12, and horizontal deflection coils represented at 13, such coils forming part of the deflection yoke for the cathode ray tube 14. For simplicity, a single deflection coil is shown, but it will be understood that the deflection yoke actually has two such coils in series or parallel. The anode of the driver tube 10 is connected to a point on the winding 15 of the transformer 11. The damper tube 12 is connected across a portion of the winding 15 through a capacitor 16. The horizontal deflection coils 13 may be connected across the same portion of the transformer winding.

Disregarding for the moment the elements provided by this invention, in operation of such a horizontal deflection system, a signal such as represented at 17 is supplied to the control grid of the driver tube 10, and through operation of the tube, deflection current is supplied to the horizontal deflection coils 13. As the operation of such a system is well understood, there is no need for detailed description thereof. It suffices to note that in such a system the deflection waveform is determined by current flow both in the damper tube and in the deflection coils. It should also be noted that during retrace, the transfer of energy from the deflection coils to the transformer 11 produces a voltage pulse across the transformer winding. As will be seen presently, the present invention makes use of the voltage pulses thus produced during successive cycles of operation.

In any such system, the deflection current waveform is determined by the ratio of inductance to resistance of the combination of the deflection coils and the damper tube. An increase in the resistance will increase the sweep velocity in the first part of the line scan, and will decrease the sweep velocity in the latter part of the scan. Conversely, a decrease in the resistance will decrease the sweep velocity in the first part of the line scan, and will increase the sweep velocity in the latter part of the scan.

In a copending application of R. C. Moore, Serial No. 619,467, filed October 31, 1956, there is disclosed and claimed an arrangement for improving linearity of line scan, in which voltage pulses are derived from the horizontal output transformer and are integrated to produce a sawtooth current which is passed through a resistor in series with the damper tube. Such an arrangement decreases the resistance of the deflection coil-damper combination by simulating the introduction of a negative resistance component.

In accordance with this invention, provision is made for both increasing and decreasing the resistance of the deflection coil-damper combination by the inclusion of a positive resistance component and by simulating the introduction of a negative resistance component. Since a resistance placed in series with the deflection coils will produce a sawtooth voltage in phase with the deflection current in the coils, a sawtooth voltage of opposite phase will have the effect of a negative resistance. The inclusion of both a positive resistance component and a simulated negative resistance component, according to this invention, enables full control of the deflection current waveform for any purpose, such as that previously mentioned. The preferred arrangement provided by this invention further enables differential variation of the positive and simulated negative resistance components to afford a wide range of control and to maintain substantially constant width of line deflection.

In this system, a resistance element 18 is connected as illustrated between the damper tube 12 and the deflection coils 13, and a movable contact 19 is provided on the resistance element and is connected to capacitor 16 and to the source of operating voltage. The simulated negative resistance component is introduced across the portion of resistance element 18 to the left of the movable contact 19 by deriving the aforementioned pulses from the transformer 11, integrating the voltage pulses into a sawtooth current, and passing this current through the said portion of resistance element 18 to produce the aforementioned opposite-phase sawtooth voltage across said portion. Thus in the preferred arrangement illustrated, voltage pulses 20 are derived from transformer 11 by means of an auxiliary winding 21 and these pulses are integrated by an inductor 22 into a sawtooth current. This current flowing through the portion of resistance element 18 to the left of the movable contact 19 produces a sawtooth voltage opposite in phase to the sawtooth voltage across the portion of element 18 to the right of contact 19. This effectively decreases the resistance of the deflection coil-damper combination.

Thus, with this arrangement, a positive resistance component is introduced to the right of contact 19, while a simulated negative resistance component is introduced to the left of contact 19. Merely adding resistance to that of the deflection coils would increase the losses in the yoke and thereby reduce the width of line deflection. However, in the arrangement provided by this invention, the losses in the system remain substantially constant due to the differential variation of the resistances on the opposite sides of the contact 19. Therefore there is no change in the width of line deflection.

In operation of this system, it will be understood that the positive resistance component to the right of contact 19 increases the resistance of the coil-damper combination and tends to modify the deflection waveform so as to increase the sweep velocity in the first part of the line scan and to decrease the sweep velocity in the latter part of the scan. It will also be understood that the simulated negative resistance component to the left of contact 19 effectively decreases the resistance of the coil-damper combination and tends to modify the deflection waveform so as to decrease the sweep velocity in the first part of the scan and to increase the sweep velocity in the latter part of the scan. Movement of the contact 19 will increase one effect and decrease the other. With contact 19 positioned at the null point, the two opposing effects will cancel one another and the deflection waveform will be unmodified. With contact 19 positioned at any other intermediate point, the modification of the deflection waveform will be the resultant of the two effects. With contact 19 positioned at the left-hand end of resistance element 18, the resistance is all positive and the modification of the deflection waveform is at one extreme. With contact 19 at the right-hand end of resistance element 18, only the simulated negative resistance component is present and the modification of the deflection waveform is at the other extreme.

From the foregoing description, it will be seen that the present invention provides a novel arrangement which affords full control of the deflection waveform and which is particularly advantageous in color television receivers for matching the deflection waveform to the pattern of the colored light emissive elements of the screen of the cathode ray tube. While a preferred embodiment of the invention has been illustrated and described, it is to be understood that the invention is not limited thereto but contemplates such modifications and further embodiments as may occur to those skilled in the art.

We claim:

1. In a deflection system for effecting line scanning in a cathode ray tube, a deflection circuit including line deflection coils arranged to effect line deflection of the electron beam within said tube and also including a damper tube in shunt with said coils, said circuit having inductance and resistance, the relative values of which affect the deflection current waveform, means for introducing a first resistance in series with said deflection coils and for introducing a second resistance in series with said damper tube, there being present across said first resistance a sawtooth voltage in phase with the deflection current in said coils, means for producing across said second resistance a sawtooth voltage opposite in phase to the first sawtooth voltage, and means for relatively varying said resistances to effect desired modification of the deflection current waveform.

2. In a deflection system for effecting line scanning in a cathode ray tube, a deflection circuit including line deflection coils arranged to effect line deflection of the electron beam within said tube and also including a damper tube in shunt with said coils, said circuit having inductance and resistance, the relative values of which affect the deflection current waveform, means for introducing a first resistance in series with said deflection coils and for introducing a second resistance in series with said damper tube, there being present across said first resistance a sawtooth voltage in phase with the deflection current in said coils, means for producing across said second resistance a sawtooth voltage opposite in phase to the first sawtooth voltage, and means for differentially varying said resistances to effect desired modification of the deflection current waveform.

3. In a deflection system for effecting line scanning in a cathode ray tube, a grid-controlled driver tube to the control grid of which a driving voltage is supplied, an output transformer connected to said driver tube, line deflection coils connected to said transformer to receive deflection current therefrom, a damper tube in shunt with said coils, the coil and damper tube combination having inductance and resistance, the relative values of which affect the deflection current waveform, means for introducing a first resistance in series with said deflection coils and for introducing a second resistance in series with said damper tube, there being present across said first resistance a sawtooth voltage in phase with the deflection current in said coils, means for deriving voltage pulses from said transformer during successive operating cycles, means for integrating said pulses into a sawtooth current and for supplying such current to said second resistance to produce thereacross a sawtooth voltage opposite in phase to the first sawtooth voltage, and means for relatively varying said resistances to effect desired modification of the deflection current waveform.

4. In a deflection system for effecting line scanning in a cathode ray tube, a deflection circuit including line deflection coils arranged to effect line deflection of the electron beam within said tube and also including a damper tube in shunt with said coils, the coil and damper tube combination having inductance and resistance, the relative values of which affect the deflection current waveform, a resistance element connected between said coils and said damper tube, a movable contact engaging said element by which variable portions of said element may be included in series with said coils and said damper tube, the portion of said element in series with said coils producing a sawtooth voltage in phase with the deflection current in said coils, and means for producing across the portion of said element in series with said damper tube a sawtooth voltage opposite in phase to the first sawtooth voltage, whereby the waveform of the deflection current may be modified by moving said movable contact to vary said portions differentially.

5. In a deflection system for effecting line scanning in a cathode ray tube, a grid-controlled driver tube to the control grid of which a driving voltage is supplied, an output transformer connected to said driver tube, line deflection coils connected to said transformer to receive deflection current therefrom, a damper tube in shunt with said coils, the coil and damper tube combination having inductance and resistance, the relative values of which affect the deflection current waveform, a resistance element connected between said coils and said damper tube, a movable contact engaging said element by which variable portions of said element may be included in series with said coils and said damper tube, the portion of said element in series with said coils producing a sawtooth voltage in phase with the deflection current in said coils, means for deriving voltage pulses from said transformer during successive operating cycles, and means for integrating said pulses into a sawtooth current and for supplying such current to the portion of said resistance element in series with said damper tube to produce across the latter portion a sawtooth voltage opposite in phase to the first sawtooth voltage, whereby the waveform of the deflection current may be modified by moving said movable contact to vary said portions differentially.

6. A deflection system according to claim 5, wherein the means for deriving voltage pulses comprises an auxiliary winding on said transformer, and the means for integrating said pulses comprises an inductor in series with said winding.

7. In a deflection system for effecting line scanning in a cathode ray tube, an output transformer, line deflection coils having one extremity connected to said transformer, a damper tube having one electrode connected to said transformer, a resistor connected between the other extremity of said coils and another electrode of said damper tube, a movable contact engaging said resistor, means coupling said contact to said transformer, means for deriving voltage pulses from said transformer, and means for integrating said pulses into a sawtooth current and for supplying such current to the portion of said resistor between said damper tube and said contact.

8. In a deflection system for effecting line scanning in a cathode ray tube, an output transformer, line deflection coils having one extremity connected to said transformer, a damper tube having one electrode connected to said transformer, a resistor connected between the other extremity of said coils and another electrode of said damper tube, a movable contact engaging said resistor, means coupling said contact to said transformer, an auxiliary winding on said transformer, an inductor, and means serially including said winding and said inductor in a circuit connected to said contact and to the junction between said resistor and said damper tube.

9. In a deflection system for effecting line scanning in a cathode ray tube, an output transformer, line deflection coils having one extremity connected to said transformer, a damper tube having one electrode connected to said transformer, a resistor connected between the other extremity of said coils and another electrode of said damper tube, a movable contact engaging said resistor, means coupling said contact to said transformer, there being present across the portion of said resistor between said contact and said coils a sawtooth voltage in phase with the deflection current in said coils, and means for producing across the portion of said resistor between said contact and said damper tube a sawtooth voltage opposite in phase to the first sawtooth voltage, whereby the waveform of the deflection current may be modified by moving said contact to vary said portions differentially.

10. In a deflection system for effecting line scanning in a cathode ray tube, an output transformer, line deflection coils having one extremity connected to said transformer, a damper tube having one electrode connected to said transformer, resistance means connected between the other extremity of said coils and another electrode of said damper tube, means for producing across one portion of said resistance means a sawtooth voltage in phase with the deflection current in said coils, means for producing across another portion of said resistance means a sawtooth voltage opposite in phase to the first sawtooth voltage, and means for relatively varying said portions to effect desired modification of the deflection current waveform.

References Cited in the file of this patent

UNITED STATES PATENTS

| | | |
|---|---|---|
| 2,568,471 | Torsch et al. | Sept. 18, 1951 |
| 2,606,305 | Court | Aug. 5, 1952 |
| 2,712,615 | Leeds | July 5, 1955 |
| 2,743,381 | Dietch | Apr. 24, 1956 |